United States Patent [19]
Marendaz

[11] 3,739,136
[45] June 12, 1973

[54] PROCESS AND APPARATUS FOR MACHINING BY ELECTRO-EROSION

[75] Inventor: Georges-Andre Marendaz, Geneva, Switzerland

[73] Assignee: Ateliers Des Charmilles S.A., Geneva, Switzerland

[22] Filed: Mar. 22, 1972

[21] Appl. No.: 236,826

[52] U.S. Cl............ 219/69 C, 219/69 G, 219/69 M
[51] Int. Cl............................ B23p 1/08, B23p 1/14
[58] Field of Search............. 219/69 C, 69 G, 69 P, 219/69 M

[56] References Cited
UNITED STATES PATENTS
3,632,942   1/1972   Kondo............................... 219/69 C

*Primary Examiner*—R. F. Staubly
*Attorney*—Robert C. Hauke, Ernest I. Gifford and Claude A. Patalidis et al.

[57] ABSTRACT

A process and installation for machining by electro-erosion, comprising means for measuring the voltage between the electrode and the part to be machined during a discharge, and a device sensitive to the difference between the voltages corresponding to two distinct discharges, this device acting upon the electrical and/or the mechanical control of the installation.

10 Claims, 17 Drawing Figures

PROCESS AND APPARATUS FOR MACHINING BY ELECTRO-EROSION

The invention relates to a process of machining by electro-erosion, according to which a succession of voltage pulses are applied within the machining gap comprised between an electrode-part to be machined and an electrode-tool intended to trigger the erosive discharges through a machining fluid filling this gap, the discharges being sustained by controlled current pulses, and in which at least one of the following machining parameters is automatically controlled:

1. The characteristic values of said electric voltage and/or current pulses,
2. The physical or chemical conditions of the machining fluid filling said gap,
3. The spacing of said electrodes, by means of electric signals obtained from the voltage measured between the electrodes and/or the current flowing through the latter and/or from a combination of these signals.

Generally, the control of the machining conditions is effected by measuring the voltage between the electrode and the workpiece, and when this voltage reaches a very low value, due to a short-circuit, the electrode is withdrawn by means of a servo-mechanism, to eliminate the short-circuit. However, it has been noticed that this procedure is not satisfactory to obtain good machining results and to prevent defects of the machined part and/or damages to the electrode due to partial fusion resulting from electric arcing.

The object of the present invention is to provide a more accurate control of the machining conditions and consequently to improve the performances of spark machining equipment. The process according to the invention is characterized by the fact that it consists of effecting repeated measurements at the average level of the voltage between the electrodes during the time interval included between the instants corresponding to the beginning of the current pulses and the instants corresponding to their ending, consists of memorizing the results of these measurements and to act upon at least one of the machining parameters, by means of an electric signal obtained in response to the differences between the results of these measurements from a current pulse to another.

The enclosed drawings represent, diagrammatically and by way of example, an embodiment of the process according to the invention. In said drawings.

Figure 1:
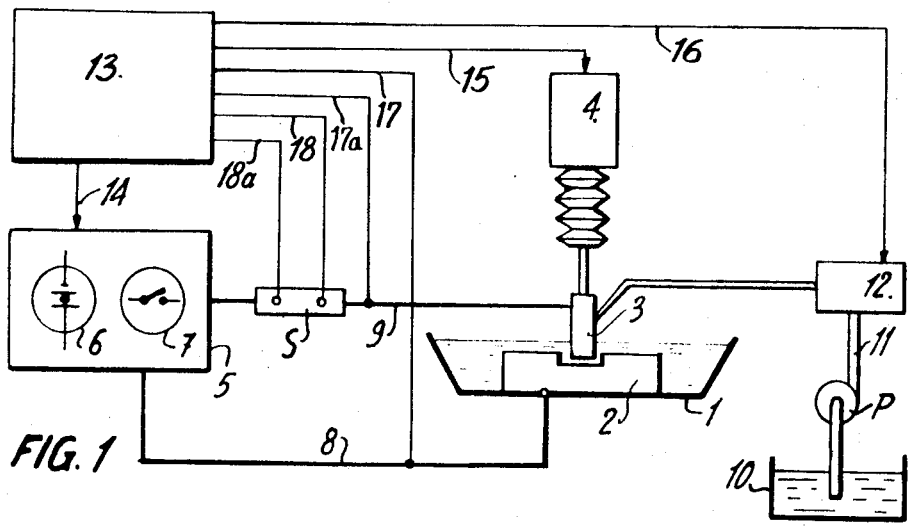
FIG. 1 is a general view of a very schematic embodiment of the invention.

The machine illustrated in FIG. 1 comprises a table 1, forming a container, supporting the workpiece 2 to be machined. An electrode 3 is displaceable in the direction of the workpiece 2 by means of a servo-mechanism 4.

The machining current is supplied by a pulse generator 5 which consists essentially of one or several continuous current sources 6 and electronic relay 7 connected to the part 2 and the electrode 3 by the conductors 8 and 9 respectively.

The machine comprises also a container 10 for the machining fluid which, usually, is a dielectric liquid. This fluid is drawn in by a pump P and channelled by a conduit 11, controlled by a valve 12, to be discharged to the electrode 3. The latter is usually equipped with one or several conduits channelling the machining fluid to its extremity to discharge it directly in the machining gap.

The machine comprises also a control device 13 acting on the pulse generator 5 through a symbolically represented control line 14. The control device 13 has also an output 15 for the control of the servo-mechanism 4 assuming the displacement of the electrode and an exit 16 which controls the valve 12, controlling the flow of the machining fluid. This control device 13 has also two inputs 17 and 17a connected to the piece to be machined and to the electrode, and inputs 18 and 18a connected to a current measuring shunt S, in order to feed the device with the voltage and current in the area of machining or gap.

Figure 1A:
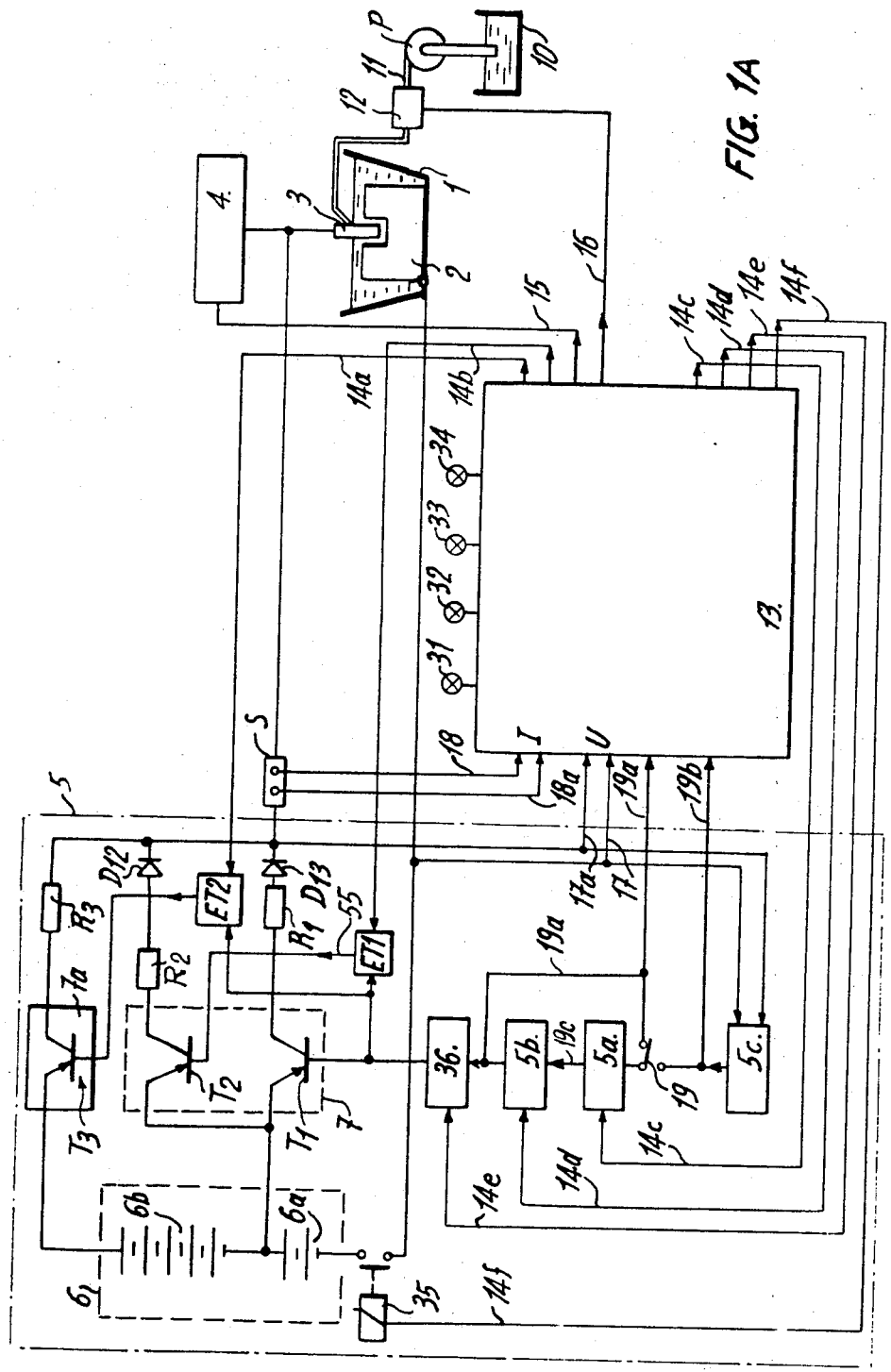
FIG. 1A shows a more detailed circuit of FIG. 1.

FIG. 1A illustrates a circuit similar to the circuit of FIG. 1, but further implemented, particularly with respect to the generator 5 and a multiplicity of connections 14a through 14f, allowing action of the control device 13 on the generator 5. The latter is of the type described in the U.S. application Ser. No. 18.803.

This generator comprises a first monostable multivibrator 5a controlling a second monostable multivibrator 5b, the exit of which is acting on a pulsator 36 which is constituted of a switch controlling the base current of a transistor $T_1$, controlling the current supplied by a continuous source 6a to the machining gap comprised between the electrode 3 and the workpiece 2. The duration of the instability period of the multivibrator 5a is determined through the multivibrator 5b, during which period of time the transistor $T_1$ is conductive. The duration of the period of time during which this transistor is non-conductive is determined by the monostable multivibrator 5b. As shown, the exit of the multivibrator 5b is connected by a line 19a to a commutator 19 controlling the inlet of the multivibrator 5a. In this way, when the multivibrator 5b flips at the end of the non-conductive period of the transistor $T_1$, a pulse is applied through line 19a and the commutator 19 at the inlet of the multivibrator 5a to set it in its unstable position which determines the duration of the pulse for the following machining sequence.

At will, the commutator 19 allows also to connect the entrance of the multivibrator 5a to a device 5c detecting a current flow between the part 2 and the electrode 3, by detecting whether the voltage between 17 and 17a is lower than the voltage of the source 6a by a value exceeding the predetermined value, this potential difference resulting from the current flowing through the resistor $R_1$.

Under certain machining conditions, a time delay occurs between the application of the machining voltage between the electrode and the workpiece, and the establishment of a current discharge between these parts. This time delay is uncertain and can vary greatly from one pulse to the next.

When the detecting device 5c is in operation, the multivibrator 5a is brought in its unstable position only at the instant that the machining current is established by a discharge between the electrode and the workpiece. In this manner, the multivibrator 5a defines the duration of the machining current for each pulse, so that all pulses have sensibly the same energy level and the same duration, independently of the duration of the delay.

The generator 5 comprises also a transistor $T_2$ as part of the electronic relay 7 controlling the flow of the machining current. A transistor $T_3$ as part of the electronic relay 7a facilitates the establishment of the machining current for each discharge, by applying a high voltage pulse to the gap. To this effect, the transistor $T_3$ connects the electrode 3 to a source of voltage 6b through a resistor $R_3$.

The application of the high voltage facilitating the establishment of the discharges originates within the control device 13 and follows a line 14a terminating at a gate $ET_2$ of the "AND" type which renders the transistor $T_3$ conductive when it receives simultaneous signals from line 14a and from the pulsator 36.

Transistors $T_1$ and $T_2$ are connected each to electrode 3 through a resistor $R_1$, $R_2$ respectively, in series with a diode $D_{12}$, $D_{13}$ respectively. These diodes are protecting the transistors $T_1$ and $T_2$ from return electric spikes originating at the source 6b during the period in which the transistor $T_3$ is conductive.

The transistor $T_2$ is connected in parallel with the transistor $T_1$ and is controlled by an "AND" gate, designated by $ET_1$, intended to increase the machining current whenever the machining conditions are favorable. To this effect, a signal is supplied by the control device 13 through line 14b, this circuit opening the gate $ET_1$, to allow the passage of the pulses supplied by the pulsator 36. In this way, the two transistors $T_1$ and $T_2$ are operating in synchronism whenever the machining conditions permit. Obviously, the transistor $T_2$ could be replaced by a multiplicity of transistors to further increase the current, when the machining conditions warrant it.

The control device has two inlets connected to lines 19a and 19b to be monitored by the beginning of the closing of the transistor $T_1$ or by the discharge within the machining gap respectively.

The control device 13 has also the outlets 14c through 14f. The outlet 14c is provided for acting upon the duration of the pulses from the multivibrator 5a, as will be further explained with reference to FIG. 15.

The outlet 14d is allowing action on the time interval between successive pulses, as will be further explained with reference to FIG. 11.

The outlet 14e allows momentary interruption of the discharges by action on the pulsator 36, as will be further explained with reference to FIG. 3.

The outlet 14f insures a definitive cut-off of the machine by action on a relay 35, in the event that the normal machining conditions can not be maintained.

The control device 13 is equipped with four pilot lights 31 through 34 intended to signal visually any malfunction of the machining process.

Figure 2A:
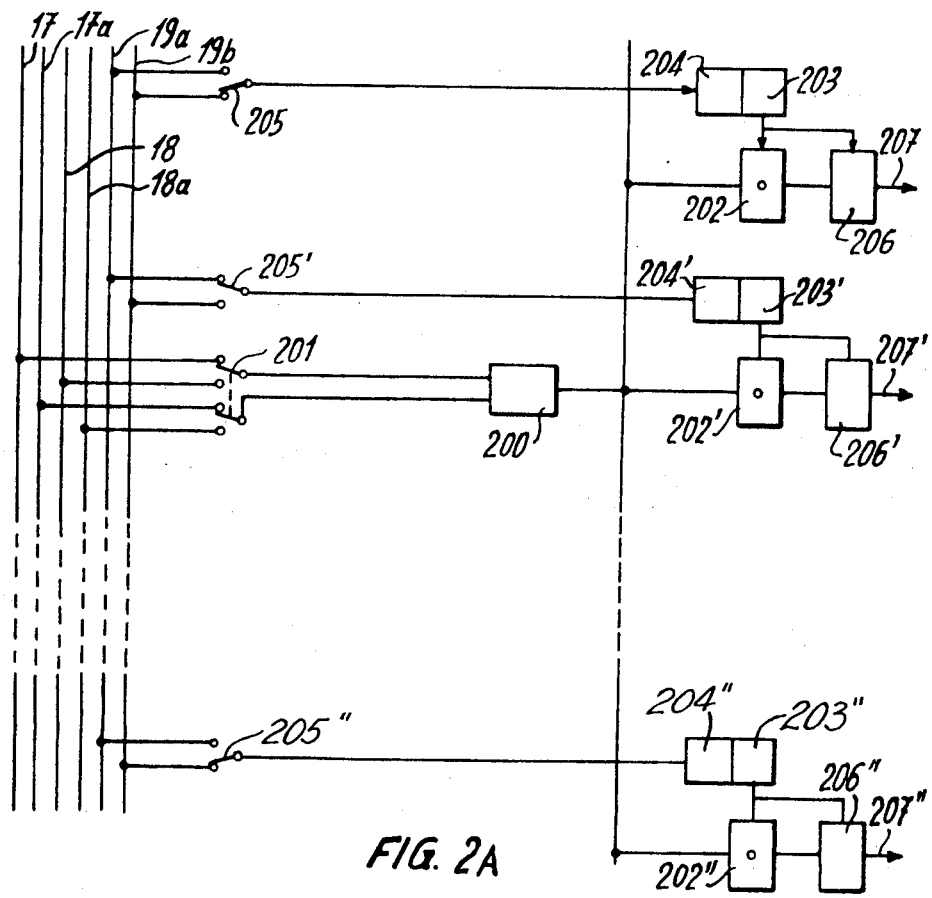
FIG. 2A is a block diagram of the generalized type of a control unit.
Figure 2:
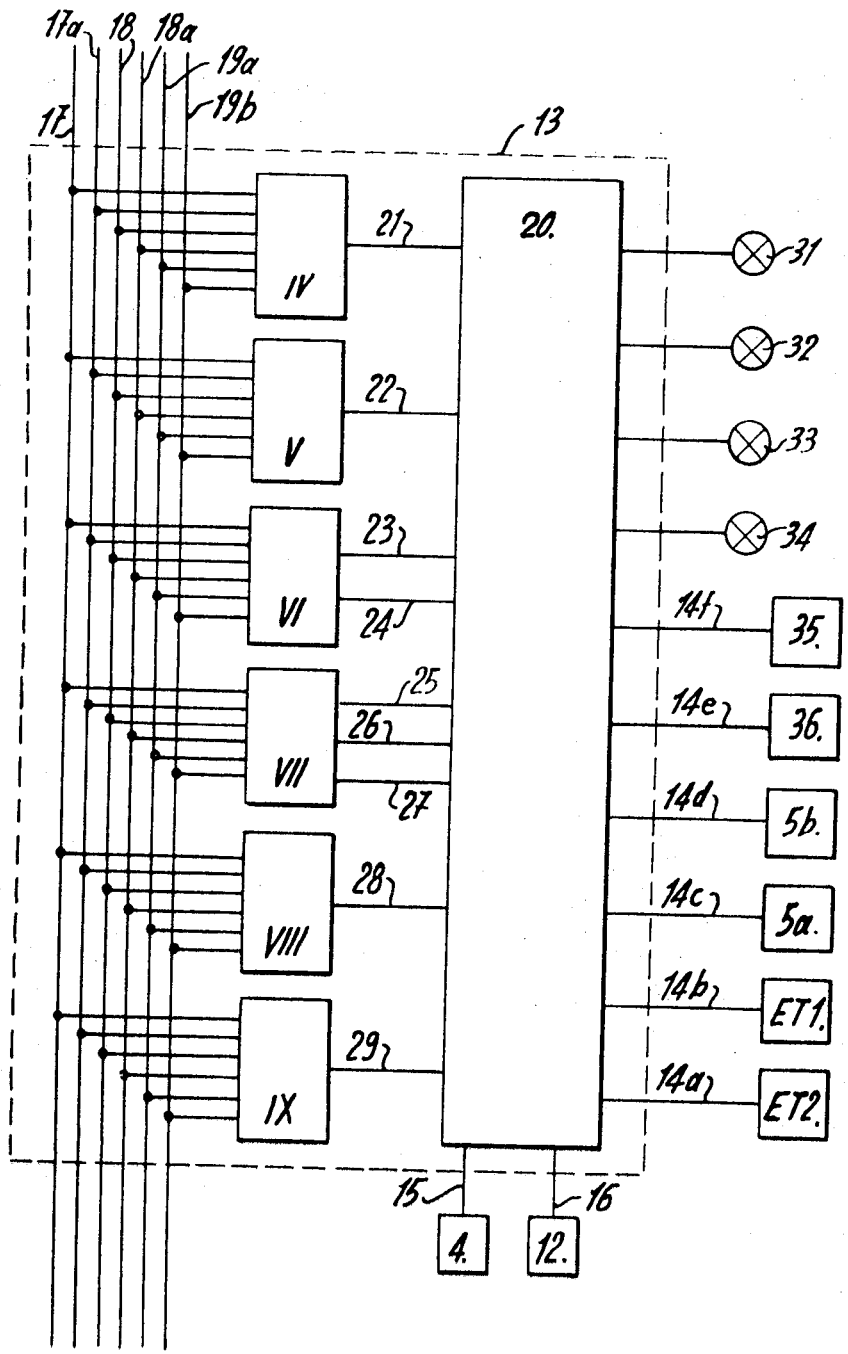
FIG. 2 illustrates the functioning principle of an electric circuit of the machine, according to FIG. 1.

Further details of the control device 13 are illustrated in FIG. 2. It comprises watching units IV through IX to check the various machining conditions criterias. The input signals of these control units are channelled through lines 17 and 17a to convey the voltage between the electrode and the part to be machined, through lines 18 and 18a for the control of the machining current flow, and through lines 19a, 19b respectively for the synchronization with the beginning of the application of a machining tension and with the beginning of the establishment of each machining discharge respectively.

The watching unit IV detects the presence of abrupt variations of voltage between the electrode and the part to be machined, during the discharges.

The watching unit V checks the presence of voltage variations between the electrode and the workpiece, between one discharge and another. The existence of such variations is a criteria of adequate functioning of the installation, since it indicates that the machining sparks are produced successively at different points of the surface to be machined. When on the other hand, several successive discharges are produced at the same geometrical point of the machined surface, the level of the voltage does not vary appreciably during the various discharges, and the watching unit V generates then an output signal indicative of unfavorable machining conditions. In fact, when the successive discharges are confined to a particular point of the part to be machined and of the electrode, localized heat is generated capable of causing damage to the surface to be machined, prior to the appearance of a short-circuit.

The watching unit VI is intended to check the pollution level of the machining fluid. This unit in fact checks the decreasing rate of the voltage between the electrode-tool and the electrode-part during the establishment of the current pulses. When the pollution level of the fluid is too high, the dielectric fluid becomes sufficiently conductive to prevent the formation of a machining spark. Then, one simply notices the passage of the current pulses between the electrode and the workpiece, the duration of which is equal to the voltage pulses applied to the electrode, and the speed of establishing the current is lower than when operating with unpolluted fluid.

The watching unit VII is intended to detect a short circuit and can be implemented very simply. In fact, it is sufficient that it reacts when the potential between the electrode and the workpiece falls below the pre-established value during the passage of the current discharge.

The watching unit VIII is intended to check the potential of the electrodes during the time elapsed from the application of each voltage pulse, between the electrode and the part to be machined, to the appearance of the current flash between the parts.

The watching unit IX checks the performing of the relay 7.

The watching units IV through IX are connected to a circuit 20 by the lines 21 through 29, feeding this circuit with data relating to the presence or to the absence of the various conditions detected by said units. Part of the logic of this circuit 20 channels the data according to its nature, on one or the other of the four pilot lights 31 through 34. The lighting of each specific light indicates the following related defect:

The light 31 indicates an insufficient rate of abrupt variations or the absence of variations.

The light 32 lights up when the pollution level of the fluid is too high.

The light 33 indicates the presence of a short-circuit.

The light 34 indicates a malfunction of the relay 7.

The logic part of the circuit 20 is further provided with two outlets 14e and 14f ending at the current cut-off devices 36 and 35 respectively. The device 35 controls a definitive cut-off of the machine, while the device 36 produces a temporary cut-off of the relay 7 to interrupt the discharges between the electrode and the workpiece. When such an interruption occurs, the cut-off of the voltage between the connecting posts 17 and 17a causes the electrode 3 to retract and increases the rate of flow of the machining fluid. At the end of a temporary cut-off of the pulses, a high machining voltage appears again at the connecting posts 17 and 17a and the servo-mechanism 4 causes the advance of the electrode 3 until the machining resumes under normal conditions.

FIG. 2A illustrates the over all diagram of a complete watching unit, however each of the watching units IV through IX will be described in detail with reference to FIGS. 4 through 9 respectively.

A typical watching unit comprises an adaptation circuit 200 which, through a commutator 201, can be switched either to the workpiece and to the electrode through the lines 17 and 17a, or to the measuring shunt S, through the lines 18 and 18a. This adaptation circuit transposes the inlet signal into an adequate form compatible with the other electronic circuits which it supplies.

The signal supplied by the adaptation circuit 200 can be checked by one or several watching circuits at an instant or during a well determined period of time with respect to the application of the machining voltage or with respect to the establishment of the machining current. To this effect, the watching unit can encompass several multiplying circuits 202, 202', 202'', each fed by the output signal of the adaptation circuit 200. Each multiplicator allows the passage of the signal for a determined laps of time by means of a timer 203, consisting, for example, of a monostable multivibrator for which the period of instability is triggered by a delay circuit 204 connected at will by an inverting switch 205 to one of the lines 19a or 19b. The exit signal of the multiplicator 202 is then transposed into a form usable by the circuits 206, 206', 206''. In this manner, we obtain at exit 207, 207', 207'' the representative signals of the machining conditions which are sought after.

DESCRIPTION OF THE LOGIC CIRCUIT

Figure 3:
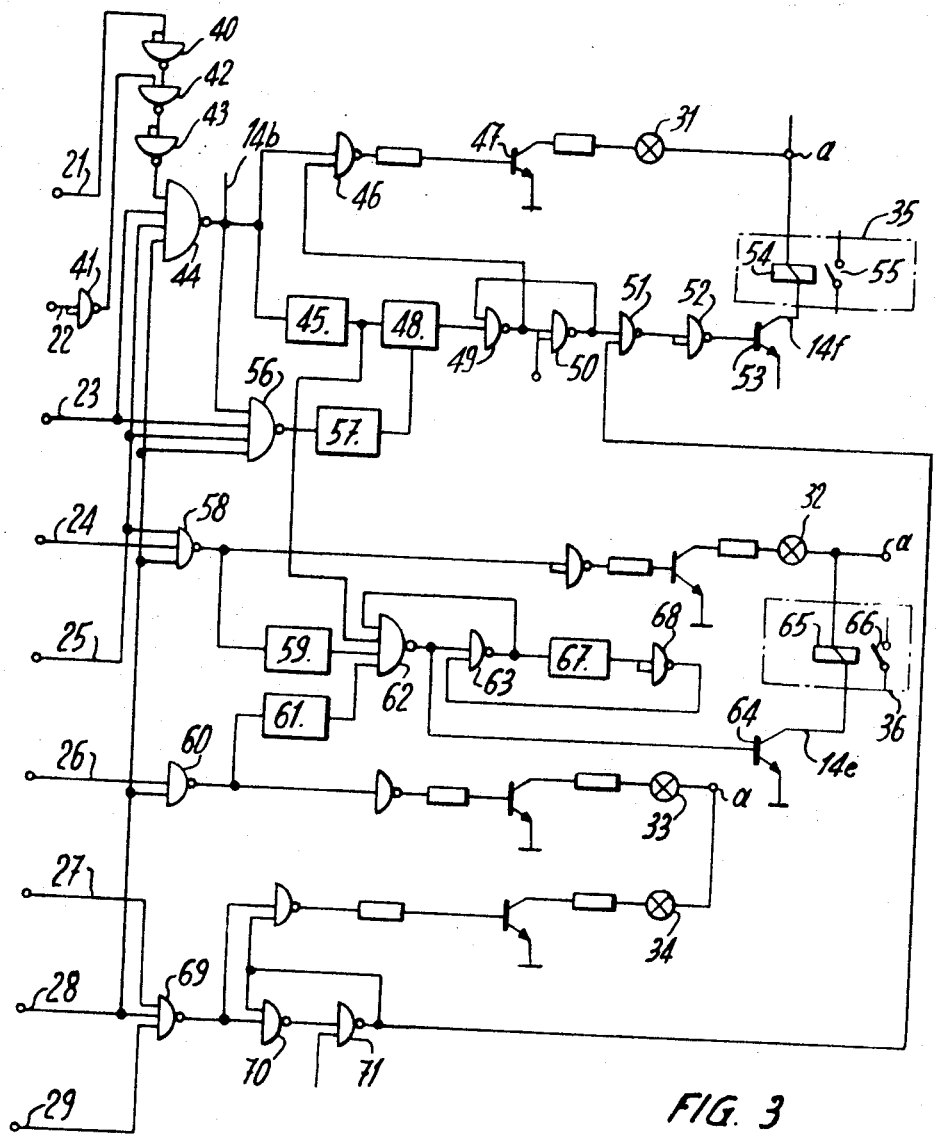
FIG. 3 shows in detail part of the circuit of FIG. 2.

FIG. 3 illustrates the logic part of the circuit 20, reference to which was made with respect to FIG. 2. The circuit comprises numerous gates, all of the "NO-AND" type. As we know, this type of gate does not transmit a signal when both entrances are receiving a signal. As soon as one or more entrance signals are missing, the "NO -AND" gates are transmitting an exit signal.

The incomming signals from lines 21 and 22 are first inverted by the gates 40 and 41, to be applied to a gate 42 of which the output signal is inverted by a gate 43 prior to being applied to one of the inlets of a gate 44 connected to lines 23 and 28.

The output of gate 44 ends, on one side of a delaying circuit 45, and on the other side to a gate 46 controlling a transistor 47 for the illumination of the pilot light 31.

The output of the delaying circuit, which imposes a 3 ms. delay to the receiving pulses, is connected to a counting circuit 48, himself connected to a holding circuit consisting, in known manner, of two "NO- AND" gates 49, 50 connected in series, the output of the second gate being connected to one of the inlets of the first gate. This holding circuit strikes a gate 51 followed by an inverting gate 52 controlling a transistor 53, the collector of which is connected, through line 14f, to the relay of the cut-off device 35, previously mentioned with respect to FIG. 1A, then to a feeding connecting post a. The energization of the coil of this relay causes the opening of its contact 35a and thus the definitive cut-off of the machine.

The lines 23, 25 and 28, connected to the three inlets of the gate 44, are also connected to three of the four inlets of a gate 56. The fourth inlet of this gate receives the output signal of the gate 44. When all machining conditions are satisfactory, each of the inlets of the gate 56 are receiving a signal, so that the output of this gate is void of any signal. The absence of signal at this output inhibits an impulse generator 57, the output of which is connected to the counter 48. The impulses supplied by the generator 57 are resetting the counter at zero.

The lines 24, 25 and 28 are connected to the inlets of a gate 58, the outlet of which is connected, similarly to gate 44, to a pollution defect display circuit consisting of a gate and a transistor for the illumination of the pilot light 32. The gate 58 is also connected to a delay circuit 59, the delay of which is set at approximately 30 ms.

Similarly, the line 26 is connected to a gate 60 the second inlet of which is connected to the line 28. The outlet signal of this gate 60 is applied similarly to 58, on one side to a signalization circuit comprising the pilot light 33 and on the other side to a delay circuit 61.

The output of the delaying circuits 45, 59 and 61 are applied to three of the four inlets of a gate 62. The fourth inlet is fed by the output of a gate 63, one entrance of which is itself connected to the output of the gate 62 to constitute a holding element assembly. The output of the gate 62 is connected to a transistor 64 controlling, through the line 14e, a relay 65, the contact 66 of which is normally closed when the machining is proceeding under satisfactory conditions. This relay 65 is part of the pulsator 36 which, in fact, constitutes a cut-off device. The contact 66 allows the interruption of the base current supplied to the transistor $T_1$.

The outlet of the gate 63 is applied to a pulse generator 67, the pulses of which are striking a gate 68, the outlet of which is connected to the inlet of the gate 63.

The lines 27, 28 and 29 are connected to the inlets of a gate 69 controlling a holding circuit composed of two gates 70 and 71 cooperating with a display device similar to the one previously described and controlling, eventually, the pilot light 34. The outlet of the gate 70 is connected to one of the inlets of the gate 71, the second inlet of the latter receiving a signal as soon as the machining operation is started.

The outlet of the gate 71 is connected to an inlet of the gate 51 to allow the definitive cut-off of the machine when the line 29 is emitting a signal indicating a malfunction of the relay 6.

The functioning of the logic circuit according to FIG. 3 is illustrated by the following table, in which the absence of signal is indicated by "0" and the presence of a signal by "I." The diagonally crossed boxes of this table are indicating that the value within the crossed box can be of any kind, but that this value is not taken into consideration due to another particular signal supplied by one of the control units:

| Unit line. | Wait | Satisfact. Finish | machin. Roughing. | Short- circuit | Pollu- tion | Arc |
|---|---|---|---|---|---|---|
| IV,21 |   | 0 | 1 |   |   | 0 |
| V,22 |   | 1 | 0 |   |   | 0 |
| VI,23 |   | 1 | 1 | 0 | 0 | 1 |
| VI,24 |   | 0 | 0 | 1 | 1 | 0 |
| VII,25 |   | 1 | 1 | 0 | 1 | 1 |
| VII,26 |   | 0 | 0 | 1 | 0 | 0 |
| VII,27 |   | 0 | 0 | 1 | 0 | 0 |
| VIII,28 | 0 | 1 | 1 | 1 | 1 | 1 |
| Gate 44 | 1 | 1 | 1 | 1 | 1 | 0 |
| Gate 58 | 1 | 1 | 1 | 1 | 0 | 1 |
| Gate 60 | 1 | 1 | 1 | 0 | 1 | 1 |
| Gate 56 | 1 | 0 | 0 | 1 | 1 | 1 |

DESCRIPTION OF THE WATCHING UNITS a. Watching unit IV

Figure 4:
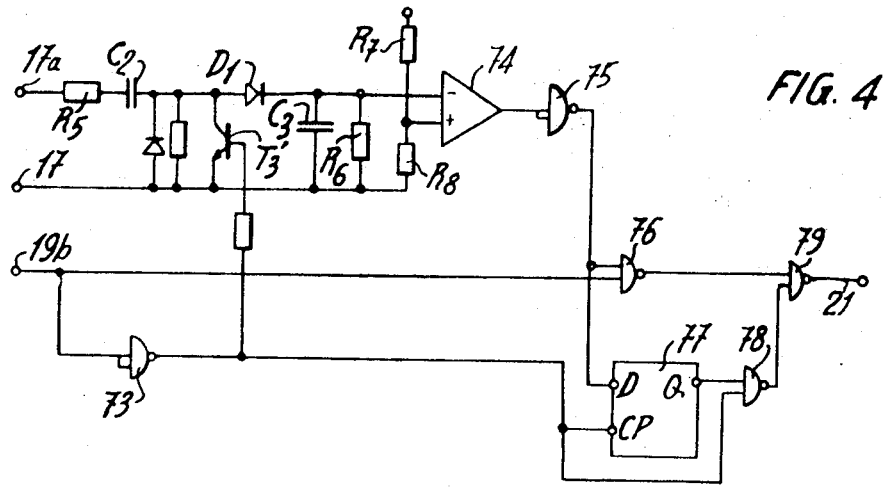
FIGS. 4 to 9 illustrate the diagram of the control units designated IV to IX in FIG. 2.

FIG. 4 illustrates the watching unit IV detecting the presence of abrupt variations of the machining voltage, that is to say, of the voltage between the electrode 3 and the workpiece 2, occuring during the time intervals comprised between instants corresponding to the beginning of the current pulses and the instants corresponding to their ending, exclusive of the instants. This watching unit comprises two inlet posts which are connected to the inlets 17 and 17a, illustrated in FIG. 1. The circuit comprises also an entrance post $19b$ intended to receive a signal synchronized with the beginning of the establishment of the machining current during each voltage pulse applied between the electrode and the workpiece. The means to generate the signal applied to the post $19b$ are not described here in detail, since they are not part of the present invention.

The machining voltage at inlets 17 and 17a is conveyed by a resistor $R_5$, a capacitor $C_2$, and a diode $D_1$ to a capacitor $C_3$ which will be charged to a potential relating solely to the level of the alternating component of the machining potential. In fact, the continuous component can not pass through the capacitor $C_2$. To avoid interference between the voltage of the capacitor $C_3$ and the high frequency components which are inherent to the application of the machine voltage between the electrode and the workpiece as well as the abrupt voltage drop at the time of the establishment of the discharge, a transistor $T_3$ is connected to short-circuit the high frequency component passing through the capacitor $C_2$ as long as the discharge is not effected. To this effect, the base of this transistor is connected to the post $19b$ through a gate 73 constituting a signal inverting element. In this manner, the high frequency components are not reaching the diode $D_1$ and the capacitor $C_3$, except during the time of each discharge. The capacitor $C_3$ is shunted by a discharge resistor $R_6$ providing, with this capacitor, a time constant long in relation to the duration of the discharges. The potential of the capacitor $C_3$ is applied to the inlet of a comparator 74, the second inlet of which receives a reference potential obtained by a voltage divider, formed by two resistors $R_7$ and $R_8$.

As long as the voltage of the capacitor $C_3$ is inferior to the voltage of reference, the comparator 74 supplies a continuous signal at its output. This signal is interrupted as soon as the voltage of the capacitor $C_3$ is higher than the reference voltage. The output signal of the comparator 74 is inverted by a gate 75, the output of which is connected to the inlet of a gate 76 and to an inlet D of a delay memory 77, or "flip-flop delay." The other inlet CP of this flip-flop 77 receives the pulses exiting from the gate 73. At the exit Q of the flip-flop 77, we obtain a signal corresponding to the signal which was applied at the inlet post D during the passage of the last positive front of the pulse applied to the post CP. This output signal of the flip-flop 77 is applied to an inlet of a gate 78. the other inlet of which receives the signal exiting from the gate 73. The output of the gate 78 is connected to an inlet of the gate 79 of which the other inlet is connected to the output of the gate 76. The latter presents still a second inlet connected to the post $19b$.

As long as the machining discharges are presenting a sufficient rate of abrupt variations, the exit Q of the flip-flop 77 supplies a continuous signal, so that at the output of the gate 78, that is to say at one inlet of the gate 79, we obtain, during each discharge a pulse comprising high frequency, the spacing of these pulses being synchronized with the spacing of the discharges.

The other inlets of the gate 79 does not receive a signal, except when the two inlets of the gate 76 are receiving a signal simultaneously, that is to say during the discharge provided by the voltage at the post $19b$ and during the signal of the gate 75 which indicates, with a slight delay, the presence of abrupt variations within the same discharge. The gate 79 emits a signal during the whole duration of a discharge and the interval between the end of this discharge and the following current pulse. The output signal of the gate 79 is transmitted through line 21 to the logic circuit 20, as shown in FIG. 2.

b. Watching unit V

Figure 5:
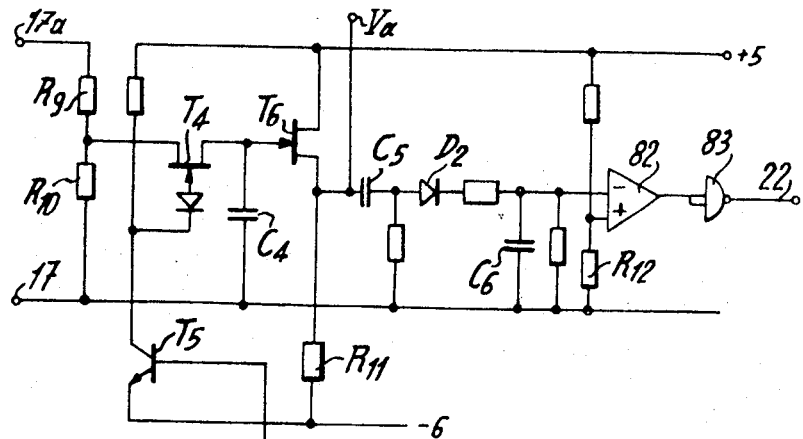
Figure 5:
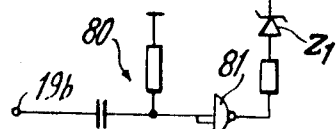

According to FIG. 5, this unit comprises a voltage divider formed by the resistors $R_9$ and $R_{10}$, supplied by the electrode-workpiece voltage appearing at the entrances 17 and 17a. The voltage at the posts of the resistor $R_{10}$ is applied to a capacitor $C_4$ through the intermediate of a field effect transistor $I_4$.

Since we desire to obtain, at the posts of the capacitor $C_4$ a voltage representing the voltage between the electrode and the workpiece for each of the successive discharges, in order to measure the variations of this voltage during the various discharges, it is necessary that the transistor $T_4$ be conductive only during the discharge and be non-conductive before the end of each discharge to prevent any effect on the potential of the capacitor $C_4$ due to the dissipation of the voltage between the electrode and the workpiece. The variations of voltage to be detected by this watching unit are very small in relation to the voltage applied between the electrode and the workpiece, by the relay 7.

The control of the transistor $T_4$ is effected from a signal applied to an inlet post $19b$ which is the same as for the watching unit IV and which receives pulses of a duration corresponding exactly to the duration of each discharge. This signal is applied to an element RC forming a differentiating circuit 80. After differentiation, this signal is inverted by a gate 81, then it is applied to a transistor $T_5$ which controls the biasing voltage of the base of the transistor $T_4$. In so doing, we obtain the conductive condition of the latter during each discharge, each period of conductivity starting slightly after the beginning of the discharge and ending before the end of the discharge.

The voltage of the capacitor $C_4$ is applied to the base of a field effect transistor $T_6$. As known, transistors of this type have an input impedance practically infinite so that the capacitor $C_4$ holds its potential, applied by the transistor $T_4$, without discharge.

The transistor $T_6$ controls the current flow through a resistor $R_{11}$ and consequently a voltage appears at the post of this resistor, representative of the voltage between the electrode and the workpiece during the discharges. The voltage at the posts of the resistor $R_{11}$ can be tapped by a post $Va$ to be applied to another circuit described later. Should the gap voltage reach slightly different values for each machining discharge, the voltage across the resistor $R_{11}$ varies at the same rate, so that the alternating components of this voltage are transmitted by a capacitor $C_5$ to a converting circuit comprising a diode $D_2$ and a capacitor $C_6$. The latter is therefore charged with a voltage corresponding to the variations between the successive values of the gap voltage. This capacitor is connected to an inlet of a comparator 82 which supplies an output signal as long as the voltage of the capacitor $C_6$ does not reach the level of the reference voltage applied to the other inlet post of the comparator 82 and resulting from the passage of the current through a resistor $R_{12}$. To accommodate the circuit 20, the output signal of the comparator 82 is inverted, by a gate 83, to obtain at the output line 22 a signal (or logic state I) when the value of the gap voltage changes slightly during each discharge, which indicates that the discharges are occuring successively at different points of the surface to be machined.

c. Watching unit VI

The purpose of this unit is to detect the pollution level of the machining fluid and to emit a warning signal when the pollution reaches a level inhibitting the formation of a discharge spark between the electrode and the workpiece, replaced by a current flow due to the conductive state of the machining fluid.

Figure 6:
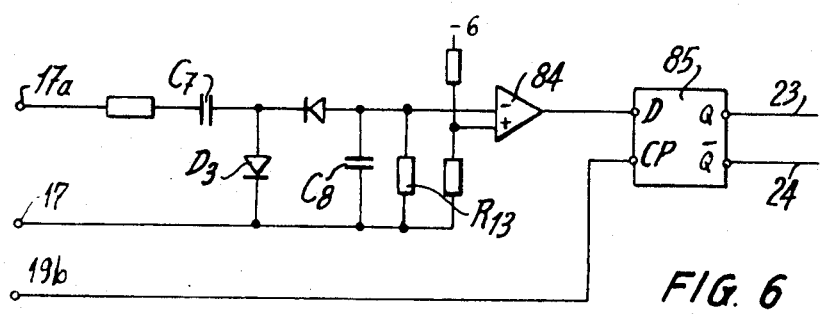

FIG. 6 illustrates a pollution detecting unit sensitive to the rate of decrease of the voltage between the electrode and the workpiece at the time of the establishment of the current pulses, after the application of the machining voltage pulse. The unit VI is connected to the posts 17 and 17a.

When abrupt variation of voltage appears between these posts, the alternating components are passing through the capacitor $C_7$ and through the diode $D_3$, when their front is of negative polarity and are charging a capacitor $C_8$ when their front is of positive polarity, that is to say when the voltage between the electrode and the workpiece is decreasing.

Similarly to the previously described circuit, the voltage of capacitor $C_8$ is compared to a reference voltage by means of a comparator 84. The output of this comparator 84 is applied to a delay memory 85 which receives the clock pulses from the detection device 5c. In this way, the flip-flop 85 memorizes the output signal of the comparator 84 at the beginning of each discharge. The constant RC of the capacitor $C_8$ discharging into a resistor $R_{13}$ is sufficiently weak to practically dissipate any charge between the end of a pulse and the beginning of the next one. The flip-flop 85 has two outlets connected to lines 23 and 24. When the unit detects the presence of pollution, the line 23 does not receive any signal, while line 24 does receive one. In the absence of pollution, line 23 has a voltage and line 24 is void of signal.

d. Watching unit VII

This unit is intended to detect the level of the voltage during the current impulse and memorize the related information. The diagram of this unit is illustrated in FIG. 7 and comprises a voltage divider formed by two resistors $R_{14}$ and $R_{15}$ connected to the inlets 17 and 17a.

A second voltage divider supplies a reference voltage to the inlet of a comparator 86. This comparator 86 emits a signal when the reference voltage is of higher value than the machining voltage, while a reverse ratio of these voltages results in the absence of signal at the output of said comparator. This output is connected, on one side, to the line 27 and, on the other side, to a flip-flop 87. This flip-flop receives the pulses from the post 19b, in order to memorize the output signal of the comparator 86 at the instant corresponding to the beginning of each discharge. The flip-flop has two outlets connected to lines 25 and 26. The outlet 25 receives a signal when the voltage is higher, and no signal when the voltage is lower than the reference voltage. The line 26, to the contrary, indicates by a signal the fact that the voltage is lower than the reference voltage.

e. Watching unit VIII

Figure 7:
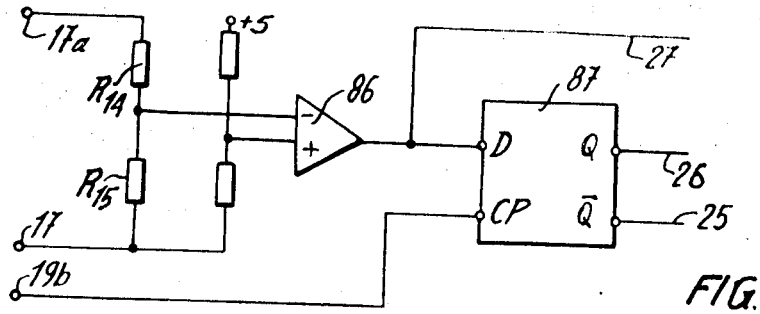
Figure 8:
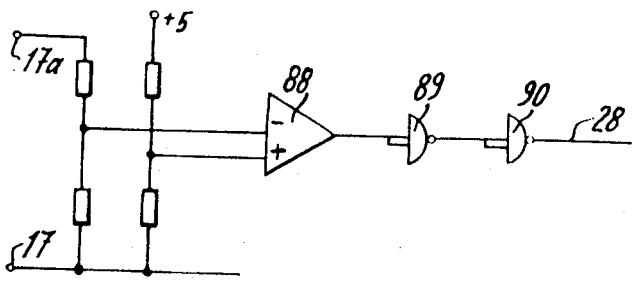

This unit illustrated in FIG. 8 comprises, similarly to the one illustrated in FIG. 7, two voltage dividers supplying, on one side, a voltage proportional to the machining voltage, present between posts 17 and 17a, and a reference voltage on the other side. Both voltages are applied to the inlet of a comparator 88 which provides an output signal each time the voltage between the electrode and the workpiece is of higher value than the reference voltage.

During the discharge between the electrode and the workpiece, the machining voltage is about 20 volts, while the voltage applied to the electrode by the relay is much higher, in the order of 80 volts, for example. By appropriate selection of the voltage dividers, it is easy to obtain a signal whenever the gap voltage is lower than 30 volts, for example.

The output signal of comparator 88 is inverted twice successively by gates 89 and 90, in order to obtain a signal impedance compatible with circuit 20.

f. Watching unit IX

Figure 9:
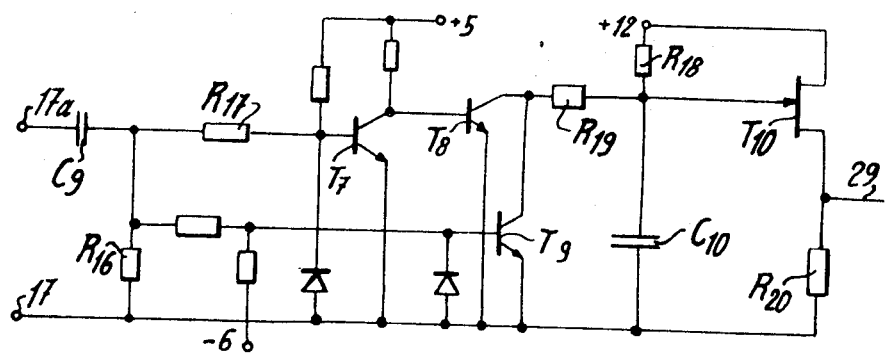

This watching unit is illustrated in FIG. 9. Its input signal is also the gap voltage, tapped at posts 17 and 17a. This voltage passes through a differentiating circuit comprising a capacitor $C_9$ and a resistor $R_{16}$. The time constant of $C_9$ and $R_{16}$ is therefore shorter than the duration of a pulse, and this differentiating circuit provides voltage spikes of positive polarity, respectively of negative polarity, for each positive or negative front of the machining voltage. The fronts of positive polarity are led by a resistor $R_{17}$ to the base of a transistor $T_7$ which himself monitors a second transistor $T_8$ intended to shunt a capacitor $C_{10}$ charged through a resistor $R_{18}$. A resistor of low value $R_{19}$ limits the discharge current into the transistor $T_8$, as well as a transistor $T_9$ connected in parallel with the transistor $T_8$, but controlled by the output voltage of the differentiator, in order to become conductive for each negative pulse of the differentiator.

As a result, the capacitor $C_{10}$ is charged through resistor $R_{18}$, but is periodically discharged by one or the other transistors $T_8$ and $T_9$.

The potential of the capacitor $C_{10}$ is applied to a unijunction transistor $T_{10}$.

When a defect is present in the relay and when the latter does no longer deliver successive pulses, no voltage appears at the output of the differentiator, and the transistors $T_8$ and $T_9$ remain non-conductive. The charging of the capacitor $C_{10}$ proceeds and as soon as its potential reaches the critical level of the unijunction transistor $T_{10}$, the latter becomes conductive and the capacitor discharges itself into a resistor $R_{20}$ supplying in so doing a pulse on line 29. This pulse is applied to the circuit 20 and triggers, through the latter, the definitive cut-off of the machine, in order to prevent any damage to the electrode, to the workpiece or to other elements of the installation.

DESCRIPTION OF AN AUTOMATIC CONTROL DEVICE

Figure 10:
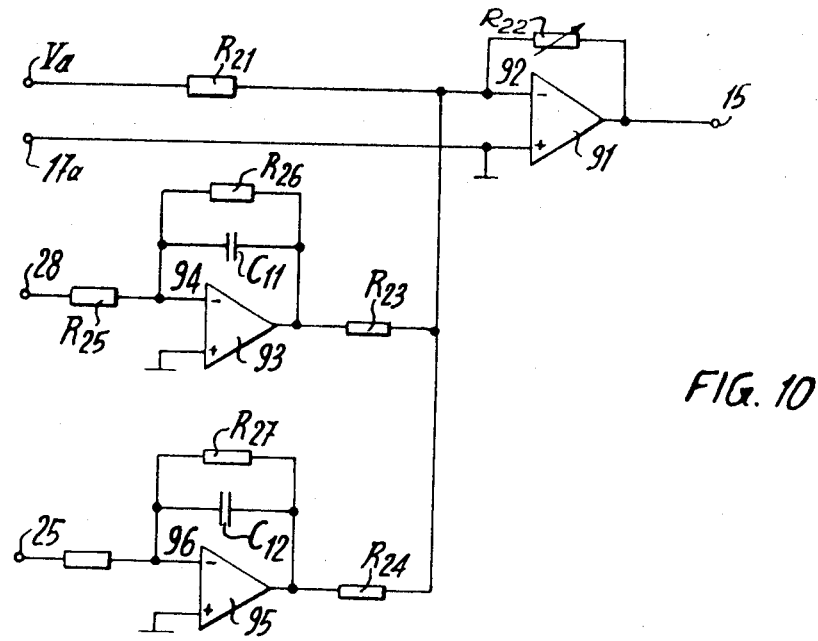
FIG. 10 shows the command circuit of the servo-mechanism.

FIG. 10 illustrates an automatic control circuit of the servo-mechanism 4, controlling the displacement of the electrode 3. The main purpose of this servo-mechanism is to maintain a precise distance between the electrode and the workpiece, to obtain the optimum machining conditions.

This circuit has an inlet 17a connected to the workpiece 2, and an inlet Va which is connected to the post similarly designated in the watching unit V (FIG. 5). As previously mentioned, a voltage representative of the gap voltage appears at this inlet Va, during the discharge only. This voltage is continuous, but variable, and it is applied, through a resistor $R_{21}$, to the inlet of an amplifier 91, the output of which constitutes the output 15 of FIG. 1 for the application of the control signal of the servo-mechanism 4. This output is moreover connected to the inlet post 92 of this amplifier 91, through a variable resistor $R_{22}$ which allows to determine the gain of the amplifier 91.

The amplifier 91 also receives on its post 92 and through the resistors $R_{23}$ and $R_{24}$ two signals relating to the time delay and the presence of short-circuits respectively.

The signal, which is function of the time delay, is obtained from an amplifier 93, the inlet post 94 of which is connected through a resistor $R_{25}$ to the post 28 which constitutes the outlet post of the watching unit VIII (FIG. 8). This post 28 receives a signal each time the gap voltage is higher than, for example, 30 volts, in other words, during the whole duration of each time delay.

The output of the amplifier 93 is connected to its inlet 94 through a resistor $R_{26}$ in parallel with a capacitor $C_{11}$. This feed-back circuit, on the one hand, defines the gain of the amplifier and, on the other hand, insures the integration of the input signal. Thus, a voltage is obtained at the output of the amplifier 93, which is proportional to the rate of time delay, in other words, to the average duration of the time delay, in relation to the machining time. From an increase of the output signal of the amplifier 93, results an increase of the signal applied to the amplifier 91, and ultimately a control signal reducing the distance between the electrode and the workpiece.

The circuit of FIG. 10 further comprises an amplifier 95, the inlet of which is connected to the outlet post 25 of the watching unit VII, illustrated in FIG. 7. This post 25 receives a signal, in the absence of a short-circuit, and conversely, receives no signal as soon as a short-circuit between the electrode and the workpiece occurs. The input signal is amplified and integrated by the amplifier 95 which has, similarly to the amplifier 93, a feed-back circuit formed by a resistor $R_{27}$ and a capacitor $C_{12}$.

The ratio of the resistors $R_{21}$, $R_{23}$, $R_{24}$ and the gain for the amplifiers 93 and 95 are affording a selective choice to obtain the desired effect on the servo-mechanism, in response to the output signal of the different watching units.

Figure 11:
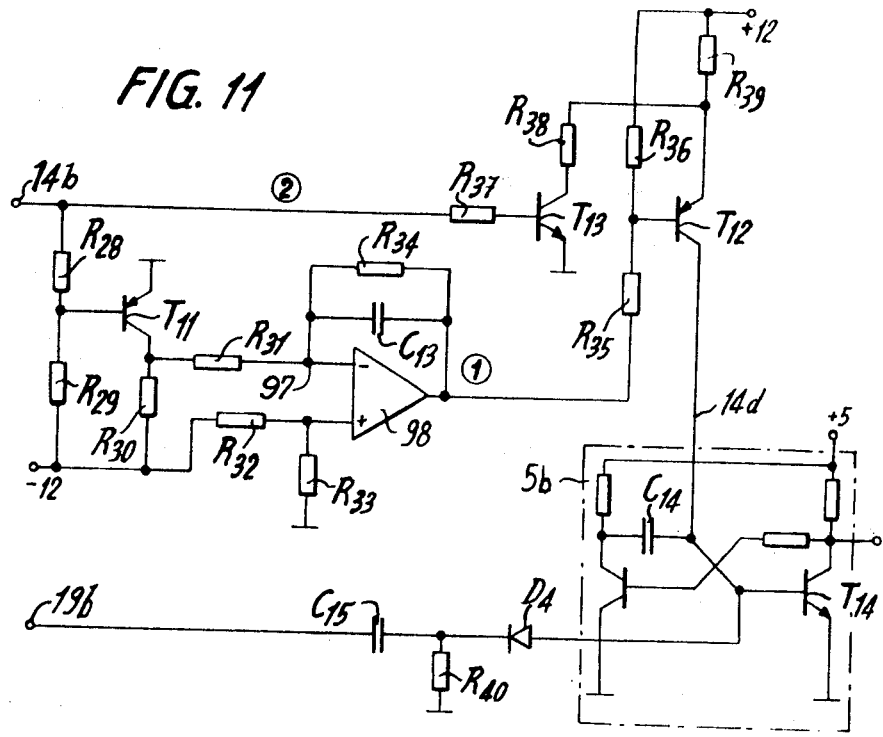
FIG. 11 represents a diagram for the setting of the time interval between two successive pulses.

FIG. 11 illustrates an automatic control device for the time interval. The function of this device is to vary the time interval between two pulses, according to the rate of unsatisfactory pulses, on the one hand, (action 1), and on the other hand, after each pulse (action 2). A high rate of unsatisfactory pulses results in an increase of the time interval between pulses.

This unit comprises a voltage divider formed by the two resistors $R_{28}$ and $R_{29}$, connected, on one side, to a set potential of $-12$ volts, and on the other side, to the current inlet post connected to the outlet of the gate 43 of FIG. 3. The inlet signal is of the logic type. A level of 0 volt indicates good machining pulses, while a level of $+5$ volts characterizes bad pulses.

The inlet signal acts upon two distinct circuits. The first (action 1) comprises an inverting circuit, formed by a transistor $T_{11}$ and by a resistor $R_{30}$. The collector of $T_{11}$ is connected, through a resistor $R_{31}$, to an inlet post 97 of an amplifier 98, the other inlet post being at a set potential obtained by a voltage divider formed by the resistors $R_{31}$ and $R_{32}$. The outlet post of the amplifier 98 is connected, on one side, to the inlet post 97 of a feedback circuit formed by a resistor $R_{34}$ setting the gain of the amplifier and by a capacitor $C_{13}$ integrating the inlet signal and, on the other side, to the base of a transistor $T_{12}$ through a voltage divider formed by the resistors $R_{35}$ and $R_{36}$. The output potential of the amplifier 98 increases its positive polarity as the rate of bad pulses gets higher, resulting in a decrease of the emitter collector current of transistor $T_{12}$.

The second circuit (action 2) is an inverting circuit. The input signal is applied to the base of a transistor $T_{13}$ through a resistance $R_{37}$. The collector of this transistor is connected to the emitter of the transistor $T_{12}$ through a voltage divider formed by resistors $R_{38}$ and $R_{39}$. When the pulse is good, this circuit has no effect on the transistor $T_{12}$; on the contrary, when the pulse is bad, the potential of the emitter of the transistor $T_{12}$ is decreased, so that the emitter collector current intensity also decreases.

The collector of the transistor $T_{12}$ is connected, through line 14d, to the capacitor $C_{14}$ of a monostable circuit. This circuit is controlled by a signal applied to the post 19b, the duration of which corresponds to the discharge time of the machining pulses. This signal is applied to the base of the output transistor $T_{14}$ of the monostable, through an integrating circuit formed by a capacitor $C_{15}$ and a resistor $R_{40}$, and a diode $D_4$ which allows the passing of spikes of negative polarity only. The end of the pulses, applied to the post 19c, inhibits the transistor $T_{14}$, which represents the front of the output signal which will extend until the capacitor $C_{14}$ is charged to a sufficiently high potential to unlock the transistor $T_{14}$. The duration of the output signal is therefore proportional to the charging rate of the capacitor $C_{14}$, which is depending on the intensity of the current supplied by the transistor $T_{12}$.

As demonstrated before, a high rate of bad pulses, or one bad pulse, results in a decrease of the current of the collector of the transistor $T_{12}$ and consequently results in a charge of the capacitor $C_{14}$ at a decreased rate, thereby increasing the duration of the output signal of the monostable. This output signal is applied to the amplifier controlling the power units, setting, among other things, the time interval proportionately to the duration of the output signal.

We obtain thereby an automatic adaptation of the average machining current by variation of the interval between the successive pulses, according to the momentary machining conditions prevailing within the machining gap.

Figure 12:
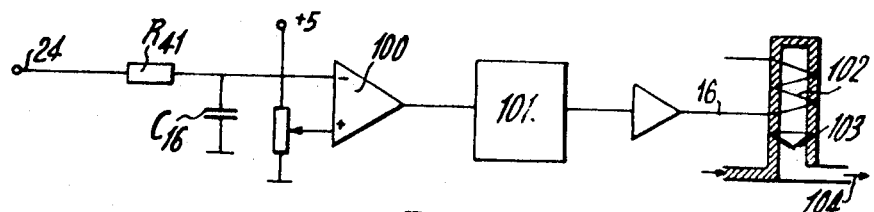
FIG. 12 is a block diagram of the circuit controlling the rate of flow of the machining fluid.

FIG. 12 represents a block diagram of a circuit controlling the fluid injection system. This circuit is controlled by signals provided by the outlet 24 of the pollution control unit VI. The purpose of the fluid injection control circuit is to regulate the flow of the machining fluid according to the degree of pollution of the fluid, within the machining gap, in consideration of the fact that when the machining fluid has reached a certain level of pollution, the electrical discharge between the electrode and the workpiece no longer produces a spark. It is therefore necessary, when the rate of bad pulses increases, to activate the supply of clean machining fluid.

The circuit of FIG. 12 comprises a pollution level regulating unit. This unit comprises a comparator 100 and an integrating circuit formed by a resistor $R_{41}$ and by a capacitor $C_{16}$. The input signal, provided by the outlet 24 of the pollution control unit VI, is applied, after integration, at an inlet of the comparator 100, the other inlet of this comparator being at a set reference potential. We obtain thereby, at the exit of the comparator, a logic signal relating to the pollution level. This signal is applied to a monostable 101, the output signal of which is of a duration determined by its RC circuit. The signal is then amplified and applied to the coil 102 of an electro-valve 103 which regulates the flow of the dielectric fluid 104.

When the pollution level of the fluid is too high, the regulating circuit produces a logic signal controlling the monostable 101. The latter produces a pulse of a determined duration, which is amplified to control the opening of the electro-valve 103 for a time duration equal to the duration of the pulse, providing thereby replacement of the dielectric fluid 104 within the machining gap.

Figure 13:
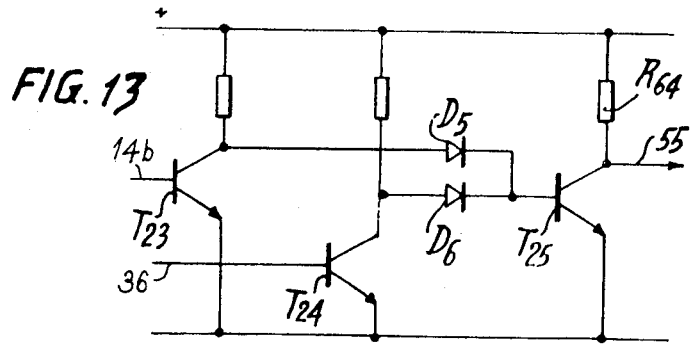
FIGS. 13 and 14 are illustrating in detail two portions of the circuit illustrated in FIG. 1A.

FIG. 13 illustrates the $ET_1$ circuit of FIG. 1A. This circuit comprises two transistors $T_{23}$ and $T_{24}$, the collectors of which are connected, each, on one side to the post of positive polarity of the power supply, through a resistor, and on the other side, to the base of a transistor $T_{25}$, by a diode $D_5$ and $D_6$. The base of the transistor $T_{23}$ is connected, by the line 14b, to the outlet of the gate 44 of the diagram of FIG. 3. The base of the transistor $T_{24}$ is connected to the outlet of the pulsator 36 of FIG. 1A.

When the machining conditions are satisfactory, the outlet of the gate 24 supplies a "1" signal. The outlet of the pulsator 36 also supplies a "1" signal when the transistor $T_1$ of the relay 7 is conductive, that is during the application of a pulse to the electrode 3. When the bases of the two transistors $T_{23}$ and $T_{24}$ are submitted to a positive signal, these transistors are conductive, so that the base of transistor $T_{25}$ is substantially at the same potential as the emitter of this transistor. The latter is therefore non-conductive, and the potential of positive polarity is applied to the outlet 55 through the resistor $R_{64}$.

As soon as one or the other of the transistors $T_{23}$ and $T_{24}$ does not receive a signal on its base, it becomes non-conductive and its collector assumes the potential of the power supply of positive polarity. This potential is then applied through one of the diodes $D_5$ or $D_6$ to the base of the transistor $T_{25}$ which becomes conductive, the collector of which falls to a potential approximating "0."

When the transistor $T_1$ is conductive and when at the same time the output signal of the gate 44 corresponds to satisfactory machining conditions, the outlet 55 receives a signal which renders the transistor $T_2$ conductive. Eventually, a plurality of transistors in parallel can provide an optimum instantaneous machining current.

Figure 14:
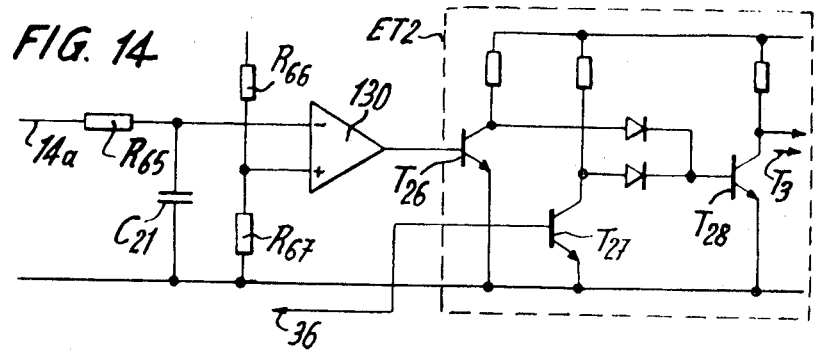

FIG. 14 represents the diagram of the $ET_2$ gate of FIG. 1A. This gate has an inlet connected to line 14a, which moreover receives the signal of line 28 directly (FIGS. 2 and 8). This line is characterized by the absence of signal when the control unit VIII detects a delay between the application of the machining voltage and the establishment of the discharge, or, conversely, remains at a "0" potential.

The purpose of the signal of the line 14a is to charge a capacitor $C_{21}$ through a resistor $R_{65}$. In the event of machining without waiting delay, this capacitor allows the application of a potential of positive polarity to a differential amplifier 130, the output of which provides a "0" signal. When a sufficient rate of waiting time is present, the capacitor $C_{21}$ discharges itself and when its potential falls below the reference potential provided by a divider, formed by the resistors $R_{66}$ and $R_{67}$, the output of the differential amplifier 130 provides a "1" signal. This signal is applied to a transistor $T_{26}$, when another transistor $T_{27}$ is in a conductive state. The base of transistor $T_{27}$ is connected to the pulsator 36.

The transistors $T_{26}$ and $T_{27}$ are controlling, in a manner similar to the one illustrated by the diagram of FIG. 13, a transistor $T_{28}$, the collector of which, by its potential, commands the base of the transistor $T_3$ (FIG. 1A) which controls the application of high voltage to the electrode to facilitate the establishment of the current discharge. The outlet of the gate $ET_2$ supplies a signal controlling the application of the high voltage solely during the period in which the transistor $T_1$ is conductive and during which the watching unit VIII indicates a waiting delay.

Figure 15:
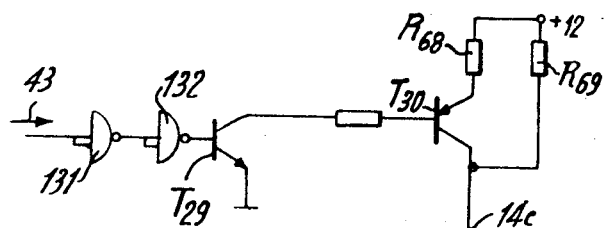
FIG. 15 shows a diagram permitting the automatic control of the duration of each discharge.
Figure 15:
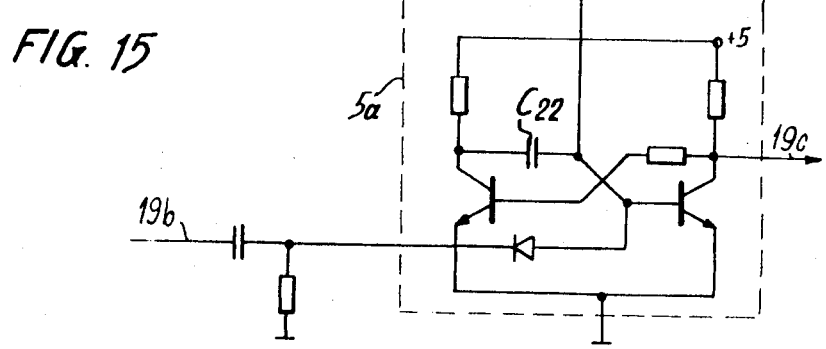

FIG. 15 illustrates a circuit allowing a decrease of the discharge duration in the event of machining presenting a too high rate of arcing. This circuit receives at its input the signal provided by the output of the gate 43 of FIG. 3. This signal acts on a transistor $T_{29}$ through the intermediary of two inverting gates 131 and 132. This transistor $T_{29}$ controls a transistor $T_{30}$ which becomes conductive, non-conductive respectively, at the same time as the transistor $T_{29}$.

The transistor $T_{30}$ allows the connecting of a resistor $R_{68}$ in parallel with the resistor $R_{69}$ to increase the charging current of a capacitor $C_{22}$ of the monostable 5a.

Should the machining be unsatisfactory, due to the absence of high frequency or due to the absence of variation of the tension triggering the spark between the electrode and the workpiece, the gate 43 (FIG. 3) will supply at its exit a "1" signal, which will render the transistor $T_{29}$ conductive as well as the transistor $T_{30}$. The charging current flowing through line 14c increases then and reduces the time duration of the instability of the monostable multi-vibrator 5a, and consequently the duration of each pulse.

It is well understood that the preceeding description refers to one example of execution of the circuits, of the process and installation, object of the invention, and that similar results could be obtained by the application of other circuits.

I claim:

1. A machining process by electro-erosion according to which a succession of voltage pulses are applied within the machining gap comprised between an electrode-part to be machined and an electrode-tool intended to trigger the erosive discharges through a machining fluid filling the gap, the discharges being sustained by controlled current pulses, and in which at least one of the following machining parameters are controlled automatically:
   1. the characteristic values of said electric voltage and/or current pulses,
   2. the physical or chemical conditions of the machining fluid filling the said gap,
   3. the spacing of said electrodes, by means of electric signals obtained from measurements of the voltage between the electrodes and/or the current flowing through the latter and/or a combination of both of these signals, wherein repeated measurements are effected of the average level of the voltage between the electrode during the time intervals included between the instants corresponding to the beginning of the current pulses and the instants corresponding to their ending, to memorize the result of these measurements and to act upon at least one of the machining parameters, by means of an electric signal obtained in response to the differences between the results of these measurements from one current pulse to another.

2. A process according to claim 1, wherein the elaboration of said signal is provided, starting from the difference between the results of the measurements from one current pulse to the next one.

3. A process according to claim 1, wherein a predetermined value is given to said electric signal when the difference between the results of the measurements of the voltage from one current pulse to another is greater than a reference difference.

4. A process according to claim 1, wherein two predetermined distinct values are given to said electric signal, depending on whether a difference greater than a difference of reference has been detected, respectively not detected, between the results of the measurements of the voltage from one current pulse to another.

5. Process according to claim 1, wherein action is provided on at least one of the machining parameters, by means of a combination of the said signal, obtained in response to the differences between the results of the measurements of the voltage from a current pulse to another, with at least another signal elaborated in a known manner, starting from the comparison, with a reference value, of the result of the repeated measurements of the average level of the voltage between the electrodes effected during the time intervals included between the instants corresponding to the beginning of the current pulses and the instants corresponding to their ending.

6. A process according to claim 1, wherein action is provided on at least one of the machining parameters, by means of a combination of said signal, obtained in response to the differences between the results of the measurements of the voltage from a current pulse to another, with at least another signal elaborated from the repeated measurements of the rate of decrease of the voltage between the electrodes the latter measurements being effected at the beginning of the passage of the current pulses.

7. A process according to claim 1, wherein action is provided on at least one of the machining parameters, by means of a combination of the said signal obtained in response to the differences between the results of the measurements of the voltage from one current pulse to another one, with at least another electric signal elaborated, in a known manner, from the repeated measurements of the voltage between the electrodes, effected during the time intervals included between the instants corresponding to the beginning of the tension pulses and the instants corresponding to the beginning of the current pulses.

8. A process according to claim 1, wherein action is provided on at least one of the machining parameters, by means of a combination of the said signal obtained in response to the differences between the results of the measurements of the voltage of a current pulse and another one, with at least one other electric signal elaborated from the repeated measurements of the abrupt variations of the voltage between the electrodes, effected at the instants corresponding to the beginning of the voltage pulses, and at the beginning and at the end of the current pulses.

9. A process according to claim 1, wherein action is provided on at least one of the machining parameters, by means of a combination of the said signal obtained in response to the differences between the results of the measurements of the voltage of a current pulse and another one, with at least one other electric signal elaborated by detecting the abrupt variations of the said voltage occuring during the time intervals included between the instants corresponding to the beginning of the current pulses and the instants corresponding to their ending, exclusive of these instants, this other electric signal being obtained in response to the presence, the absence respectively, of these abrupt variations of the voltage.

10. An installation for working out the process according to claim 1, wherein first means are comprised, capable of being momentarily rendered sensitive during the passage of said pulses, to the gap voltage and for which the electrical condition is then function of this voltage, these means being further capable of maintaining their preceding electrical conditions for the time intervals during which they are rendered unsensitive to this voltage, and second means are comprised which are sensitive to the electrical condition variations of the first means and designed and disposed in a manner permitting the delivery of a control signal of at least one of the machining parameters, this signal varying with the difference of the electrical conditions of the first means by a time interval during which they are unsensitive to another.

* * * * *

CMS-111 A

UNITED STATES PATENT OFFICE
CERTIFICATE OF CORRECTION

Patent No. 3,739,136          Dated June 12, 1973

Inventor(s)    Georges-Andre Marendaz

It is certified that error appears in the above-identified patent and that said Letters Patent are hereby corrected as shown below:

In Foreign Application Priority Data

Insert - - Mar. 25, 1971 Switzerland.....No. 4402/71 - -

IN THE SPECIFICATION

Column 2, line 26, change "exit" to - - output - - line 41, change "exit" to - - output - - line 51, change "exit" to - - output - - line 53, change "inlet" to - - input - - line 57, change "inlet" to - - input line 58, change "position" to - - state - - line 61, change "entrance" to - - input - - line 63, after "between" insert - - the inputs -- line 64, after "17a" insert - - of the control device 13 - -

ORM PO-1050 (10-69)

Page 2
Patent No. 3,739,136

Column 3, line 51, change "inlets" to -- inputs -- line 55, change "outlets" to -- outputs -- line 56, change "outlet" to -- output -- line 59, change "outlet" to -- output -- line 62, change "outlet" to -- output -- line 65, change "outlet" to -- output --

Column 5, line 10, change "outlets" to -- outputs -- line 16, change "connecting posts" to -- lines -- line 20, change "connecting posts" to -- lines -- line 28, after "unit" insert a comma (,) followed by -- as illustrated at Fig. 2A -- line 45, after the comma (,) insert -- 203', 203", each -- line 49, change "exit" to -- output -- line 52, change "exit" to -- output -- lines 59 and 60, cancel " "NO- and" " and insert thereinstead -- "NAND" -- line 62, change "entrance" to -- input line 63, change " "NO -AND" " to -- "NAND" -- change "exit" to -- output -- line 66, change "gates" to -- inverters -- line 67, change "gate" to -- inverter --

Page 3
Patent No. 3,739,136

Column 6, line 1, change "inlets" to -- inputs -- line 3, change "of" to -- to -- line 7, change "receiving" to -- received -- line 8, change "himself" to -- itself -- line 9, change " "NO- AND" " to -- "NAND" -- line 11, change "inlets" to -- inputs -- line 17, after "coil" insert -- 54 -- line 18, change "35a" to -- 55a -- line 20, change "inlets" to -- inputs -- line 22, change "inlets" to -- inputs -- change "inlet" to -- input -- line 24, change "inlets" to -- inputs -- line 31, change "inlets" to -- inputs -- line 39, change "inlet" to -- input -- line 40, after "to" insert -- that of gate -- line 44, change "inlets" to -- inputs -- line 45, change "inlet" to -- input -- lines 45-46, change "entrance" to -- input -- line 55, change "outlet" to -- output -- line 57, change "outlet" to -- output -- change "inlet" to -- input --

Page 4
Patent No. 3,739,136

Column 6, line 58, change "inlets" to -- inputs -- line 62, change "outlet" to -- output -- line 63, change "inlets" to -- inputs -- line 64, change "inlet" to -- input -- line 66, change "outlet" to -- output -- change "inlet" to -- input --

Column 7, line 12, in the Table, change "Are" to -- Arc -- line 33, change "inlet" to -- input -- change "posts" to -- terminals -- line 34, change "inlets" to -- inputs -- line 35, change "entrance" to -- input -- change "post" to -- terminal -- line 40, change "post" to -- terminal -- line 42, change "inlets" to -- inputs -- line 53, change "$T_3$" to -- $T'_3$ -- line 57, change "post" to -- terminal -- line 64, change "inlet" to -- input -- line 65, change "inlet" to -- input --

Page 5
Patent No. 3,739,136

Column 8, line 6, change "gate" to -- inverter -- line 8, change "inlet" to -- input -- line 9, change "inlet" to -- input -- line 10, change "exit" to -- output -- line 12, change "inlet" to -- input -- line 13, change "post" to -- terminal -- line 15, change "inlet" to -- input -- (two occurren[ces])

line 16, change "gate" to -- inverter -- line 17, change "inlet" to -- input -- line 18, change "inlet" to -- input -- line 19, change "inlet" to -- input -- line 20, change "post" to -- terminal -- line 22, change "exit" to -- output -- line 24, change "inlet" to -- input -- line 28, change "inlets" to -- inputs -- line 29, change "inlets" to -- inputs -- line 31, change "post" to -- terminal -- line 32, change "gate" to -- inverter -- lines 43-44, change "entrances" to -- input termina[ls]

line 44, change "posts" to -- terminals -- line 46, change "$I_4$" to -- $T_4$ -- line 47, change "posts" to -- terminals -- line 61, change "inlet" to -- input --

Page 6
Patent No. 3,739,136

Column 8, lines 66-67, after "applied" insert - - through a Zener diode $Z_1$ - - line 67, after "to" insert - - the base of - -

Column 9, line 13, change "post" to - - terminal - - line 16, change "post" to - - terminal - - line 25, change "inlet" to - - input - - line 28, change "inlet" to - - input - - line 50, change "posts" to - - terminals - - line 52, change "posts" to - - terminals - - line 62, after "5c" insert a comma (,) followed by - - Fig. 1A, through line 19b - -

Column 10, line 2, change "outlets" to - - outputs - - line 12, change "inlets" to - - input terminals - - after numeral "17a" insert - - supplying a voltage to an input of a comparator 86 - - line 21, change "post" to - - terminal - - line 23, change "outlets" to - - outputs - - line 24, change "outlet" to - - output - - line 33, change "posts" to - - terminals - - line 35, change "inlet" to - - input - -

Page 7
Patent No. 3,739,136

Column 10, line 51, change "posts" to -- terminals -- line 60, change "himself" to -- itself -- line 61, before the period (.) insert -- from a DC voltage source --

Column 11, line 15, after numeral "20" insert a comma (,) followed by -- Fig. 2, -- line 28, change "inlet" to -- input -- line 29, change "post" to -- terminal -- line 32, change "inlet" to -- input -- line 34, change "inlet" to -- input -- line 37, change "of" to -- to -- line 38, change "inlet" to -- input -- line 41, change "post" to -- terminal -- line 46, change "inlet" to -- input -- line 47, change "post" to -- terminal -- line 48, change "outlet" to -- output -- change "post" to -- terminal -- line 49, change "post" to -- terminal -- line 54, change "inlet" to -- input -- line 67, change "inlet" to -- input -- change "outlet" to -- output -- change "post" to -- terminal --

Page 8
Patent No. 3,739,136

Column 12, line 1, change "post" to -- terminal -- line 24, change "inlet" to -- input -- change "post" to -- terminal -- change "outlet" to -- output line 14b -- change "43" to -- 44 -- line 25, change "inlet" to -- input -- line 28, change "inlet" to -- input -- line 31, after "of" insert -- transistor -- change "inlet" to -- input -- line 32, change "post" to -- terminal -- change "inlet" to -- input -- change "post" to -- terminal -- line 34, change "$R_{31}$" to -- $R_{33}$ -- change "outlet" to -- output -- line 35, change "inlet" to -- input -- change "post" to -- terminal -- line 38, change "inlet" to -- input -- line 57, change "post" to -- terminal --

Page 9
Patent No. 3,739,136

Column 13, line 20, change ""outlet" to -- output -- line 35, change "outlet" to -- output -- line 36, change "inlet" to -- input -- line 37, change "inlet" to -- input -- line 38, change "exit" to -- output -- line 56, change "post" to -- terminal -- line 61, change "outlet" to -- output -- line 64, change "outlet" to -- output --

(1st occurrence)

cancel "24" and insert thereinstead -- 44 (Fig. 3 and table) --

Column 14, line 6, change "outlet" to -- output -- line 18, change "outlet" to -- output -- line 24, change "inlet" to -- input -- line 58, change "gate" to -- inverter --

Column 15, line 4, change "gate" to -- inverter -- line 5, change "exit" to -- output --

Page 10
Patent No. 3,739,136

IN THE CLAIMS

Column 15, line 19, after "within" cancel "the" and insert thereinstead - - a - - after "gap" cancel "comprised"

line 29, after "filling" cancel "the"

after the comma (,) insert - - and - - line 34, before "signals" cancel "these" and insert thereinstead - - said - - after the comma (,) cancel "wherein" and insert thereinstead - - said method comprising effecting - - cancel "are"

line 35, cancel "effected"

line 39, cancel "to memorize" and insert thereinstead - - memorizing - - cancel "these" and insert thereinstead - - said - - line 40, cancel "to act" and insert thereinstead - - acting - - line 41, cancel the comma (,)

line 43, change "these" to - - said - - line 62, cancel the comma (,)

Page 11
Patent No. 3,739,136

Column 15, line 63, cancel the comma (,)

line 66, cancel the comma (,)

cancel "in a"

line 67, cancel "known manner,"

before "starting" insert -- by -- after "comparison" cancel the comma (,)

line 68, cancel the comma (,)

Column 16, line 13, after "electrodes" insert a comma (,)

line 17, cancel the comma (,)

line 21, cancel the comma (,)

line 22, cancel ", in a known manner,"

line 23, cancel the comma (,)

line 39, cancel the comma (,)

line 40, cancel "the"

line 43, cancel the comma (,)

line 44, cancel "the"

line 48, change "this" to -- said -- line 49, cancel the comma (,)

line 50, before "the" insert -- or -- cancel "respectively,"

change "these" to -- the --

Page 12
Patent No. 3,739,136

Column 16, line 52, change "installation" to - - apparatus - - line 53, cancel ", wherein" and insert thereinstead - - comprising - - cancel "are comprised,"

line 55, cancel the comma (,)

line 56, change "is then" to - - becomes a - - change "this" to - - said gap - - line 57, change "these" to - - said - -

Signed and sealed this 5th day of February 1974.

(SEAL)
Attest:

EDWARD M. FLETCHER, JR.
Attesting Officer

RENE D. TEGTMEYER
Acting Commissioner of Patents